US012640157B2

(12) United States Patent
Kim et al.

(10) Patent No.: US 12,640,157 B2
(45) Date of Patent: May 26, 2026

(54) HIGHER ORDER AMBISONICS ENCODING AND DECODING

(71) Applicant: Apple Inc., Cupertino, CA (US)

(72) Inventors: Moo Young Kim, San Diego, CA (US); Sina Zamani, Cupertino, CA (US); Dipanjan Sen, Dublin, CA (US)

(73) Assignee: Apple Inc., Cupertino, CA (US)

( * ) Notice: Subject to any disclaimer, the term of this patent is extended or adjusted under 35 U.S.C. 154(b) by 408 days.

(21) Appl. No.: 18/246,030

(22) PCT Filed: Aug. 13, 2021

(86) PCT No.: PCT/US2021/045976
§ 371 (c)(1),
(2) Date: Mar. 20, 2023

(87) PCT Pub. No.: WO2022/066313
PCT Pub. Date: Mar. 31, 2022

(65) Prior Publication Data

US 2023/0360655 A1 Nov. 9, 2023

Related U.S. Application Data

(60) Provisional application No. 63/083,673, filed on Sep. 25, 2020.

(51) Int. Cl.
*G10L 19/02* (2013.01)
*G10L 19/008* (2013.01)
*G10L 19/24* (2013.01)

(52) U.S. Cl.
CPC ........ *G10L 19/0204* (2013.01); *G10L 19/008* (2013.01); *G10L 19/24* (2013.01)

(58) Field of Classification Search
CPC ..... G10L 17/02; G10L 19/008; G10L 19/167; G10L 19/00; H04S 2420/01; H04S 2420/11
See application file for complete search history.

(56) References Cited

U.S. PATENT DOCUMENTS 9,691,406 B2 * 6/2017 Jax .......................... G10L 19/038
9,959,876 B2 5/2018 Kim et al.
2012/0065965 A1 3/2012 Choo et al.
(Continued)

FOREIGN PATENT DOCUMENTS

CN 1361912 A 7/2002
CN 103210443 A 7/2013
(Continued)

OTHER PUBLICATIONS

Daniel, Adrien. Spatial auditory blurring and applications to multichannel audio coding. Diss. Université Pierre et Marie Curie-Paris VI, 2011. (Year: 2011).*
(Continued)

*Primary Examiner* — Mark Villena
(74) *Attorney, Agent, or Firm* — Aikin & Gallant, LLP

(57) ABSTRACT

Encoding and decoding of higher order ambisonics, HOA, data for purposes of bitrate reduction. One aspect uses principal components analysis to produce spatial descriptors. Other aspects include various spatial descriptor quantization techniques.

18 Claims, 16 Drawing Sheets

(56) References Cited

U.S. PATENT DOCUMENTS

| | | | | |
|---|---|---|---|---|
| 2014/0249827 | A1* | 9/2014 | Sen | G10L 19/167 704/500 |
| 2014/0355770 | A1 | 12/2014 | Peters et al. | |
| 2014/0358565 | A1* | 12/2014 | Peters | G10L 19/002 704/500 |
| 2015/0332681 | A1 | 11/2015 | Kim et al. | |
| 2015/0332682 | A1 | 11/2015 | Kim et al. | |
| 2015/0340044 | A1* | 11/2015 | Kim | G10L 19/002 381/23 |
| 2019/0108447 | A1* | 4/2019 | Kounavis | G06V 10/82 |
| 2020/0118574 | A1 | 4/2020 | Keiler et al. | |
| 2020/0169824 | A1 | 5/2020 | McGrath | |
| 2022/0148607 | A1* | 5/2022 | Ragot | G10L 19/032 |

FOREIGN PATENT DOCUMENTS

| | | | |
|---|---|---|---|
| CN | 107403626 | A | 11/2017 |
| CN | 110544484 | A | 12/2019 |
| EP | 3143613 | A1 | 3/2017 |
| EP | 3282448 | A2 | 2/2018 |
| WO | 106490 | A1 | 1/2001 |
| WO | 2014012944 | A1 | 1/2014 |
| WO | 2016001355 | A1 | 1/2016 |

OTHER PUBLICATIONS

Zamani et al.,"Spatial Audio Coding with Backward-Adaptive Singular Value Decomposition", received from https://scl.ece.ucsb.edu/sites/default/files/publications/spatial_audio_compression_with_adaptive_singular_value_decomposition_using_reconstructed_frames.pdf, Oct. 17, 2018, 7 pages.

Daniel et al., "Further Study of Sound Field Coding with Higher Order Ambisonics", received from https://www.researchgate.net/publication/277841868_Further_Study_of_Sound_Field_Coding_with_Higher_Order_Ambisonics, May 8-11, 2004, 14 pages.

M. M. Goodwin and J. Jot, "Primary-Ambient Signal Decomposition and Vector-Based Localization for Spatial Audio Coding and Enhancement," ICASSP '07, 2007, pp. I-9-I-12.

B. Cheng, C. Ritz and I. Burnett, "A Spatial Squeezing approach to Ambisonic audio compression," 2008 ICASSP, pp. 369-372.

Information technology—High efficiency coding and media delivery in heterogeneous environments—Part 3: 3D audio, ISO/IEC Std. ISO/IEC JTC1/SC29 23 008-3:2015, 2015.

D. Sen, N. Peters, M. Kim, and M. Morrell, "Efficient Compression and Transportation of Scene Based Audio for Television Broadcast," AES 2016.

S.Zamani, T.Nanjundaswamy,and K.Rose, "Frequency domain singular value decomposition for efficient spatial audio coding," in Proc. WASPAA, 2017, pp. 126-130.

A. Politis, S. Tervo, V. Pulkki, "Compass: Coding and Multidirectional Parameterization of Ambisonic Sound Scenes," ICASSP, 2018.

P. Mahé, S. Ragot, S. Marchand, "First-Order Ambisonic Coding with PCA Matrixing and Quaternion-Based Interpolation," DAFx19, 2019.

Politis et al., "Overview of Time-Frequency Domain Parametric Spatial Audio Techniques", received from https://ieeexplore.ieee.org/document/8320502, 2018, 20 pages.

Pulkki et al., Parametric Time-Frequency Domain Spatial Audio, Wiley-IEEE Press, received from https://ieeexplore.ieee.org/book/8320443, Copyright Year: 2018, 67 pages.

PCT/US2021/045976, "PCT Notification Concerning Transmittal of International Preliminary Report on Patentability (Chapter I of the Patent Cooperation Treaty) and Written Opinion of International Searching Authority", mailed Apr. 6, 2023, 19 pages.

* cited by examiner $$\hat{H} = \sum_{i=1}^{N_{SC}} \hat{X}_i \hat{W}_i^T + \hat{\mu}_H$$

Separate SD for each and every combination of SD group and SB

| | SD group #1 | SD group #2 | SD group #3 | SD group #4 |
|---|---|---|---|---|
| SB1 | × | × | × | × |
| SB2 | × | × | × | × |
| SB3 | × | × | × | × |
| SB4 | × | × | × | × |

Missing SD for some combinations of SD group and SB

| | SD group #1 | SD group #2 | SD group #3 | SD group #4 | |
|---|---|---|---|---|---|
| SB1 | × | × | × | × | → 4 SDs for SB1 |
| SB2 | × | × | × | | → 3 SDs for SB2 |
| SB3 | × | × | × | × | → 4 SDs for SB3 |
| SB4 | × | × | | | → 2 SDs for SB4 |

FIG. 10

Separate salient component for each group and every combination of salient component and SB

| | SC group #1 | SC group #2 | SC group #3 | SC group #4 |
|---|---|---|---|---|
| SB1 | x | x | x | x |
| SB2 | x | x | x | x |
| SB3 | x | x | x | x |
| SB4 | x | x | x | x |

Missing salient component for some combinations of salient component group and SB

| | SC group #1 | SC group #2 | SC group #3 | SC group #4 |
|---|---|---|---|---|
| SB1 | x | x | x | x |
| SB2 | x | x | x | x |
| SB3 | x | x | x | |
| SB4 | x | x | | |

Empty sub-band: Do not have to format into the bitstream

FIG. 11

<table>
<tr><th></th><th>SD group #1</th><th>SD group #2</th><th>SD group #3</th><th>SD group #4</th></tr>
<tr><td>SB1</td><td rowspan="4">0</td><td>0</td><td>0</td><td>0</td></tr>
<tr><td>SB2</td><td>0</td><td>0</td><td>0</td></tr>
<tr><td>SB3</td><td>0</td><td>0</td><td>o_copied</td></tr>
<tr><td>SB4</td><td>0</td><td>o_copied</td><td>o_copied</td></tr>
<tr><td>Required # of analysis operations</td><td>1</td><td colspan="3">4</td></tr>
</table>

FIG. 13

<table>
<tr><th></th><th>SD group #1</th><th>SD group #2</th><th>SD group #3</th><th>SD group #4</th></tr>
<tr><td>SB1</td><td rowspan="4">0</td><td>0</td><td>0</td><td rowspan="2">0</td></tr>
<tr><td>SB2</td><td>0</td><td>0</td></tr>
<tr><td>SB3</td><td>0</td><td rowspan="2">0</td><td rowspan="2">0</td></tr>
<tr><td>SB4</td><td>0</td></tr>
<tr><td>Required # of analysis operations</td><td>1</td><td>4</td><td>1</td><td>1</td></tr>
</table>

FIG. 14

| | SD group #1 | SD group #2 | SD group #3 | SD group #4 |
|---|---|---|---|---|
| SB1 | 0 | 0 | 0 | 0 |
| SB2 | | 0 | 0 | |
| SB3 | | 0 | | 0 |
| SB4 | | 0 | 0 | |
| Required # of analysis operations | 1 | 4 | 3 | 2 |

FIG. 15

HIGHER ORDER AMBISONICS ENCODING AND DECODING

This patent application claims the benefit of the earlier filing date of U.S. provisional patent application No. 63/083,673 filed Sep. 25, 2020.

FIELD

This disclosure relates to techniques in digital audio signal processing and in particular to bitrate reduction of higher order ambisonics, HOA, data.

BACKGROUND

A sound field can be represented by a summation of weighted, spherical harmonic basis functions of increasing order 0, 1, 2, . . . . As the set of basis functions is extended to include higher order elements (order two and higher), the representation of the sound field becomes more detailed (higher resolution). The weights that are applied to the basis functions are referred to as spherical harmonic coefficients. The term higher order ambisonics, HOA, data is used generically to refer to such a representation of a sound field.

Digital audio content in which a sound field is represented by HOA data may be transferred over a communication link from one location to another location, for playback at the latter location over an arbitrary sound output system. At the sound output system, the HOA data is transformed, through digital signal processing, into speaker driver signals. Examples include loudspeaker driver signals of for instance a two channel loudspeaker system or a 5.1 surround sound system, and binaural left and right headphone driver signals. The communication link however may not always have sufficient bandwidth to transfer raw or uncompressed HOA data for real-time, pause-free playback. Some codec techniques been proposed to encode and in particular compress the raw HOA data into a reduced bitrate encoded bitstream, for transfer over a limited bandwidth communication link, and then decode the raw HOA data at the destination sound output system (before transforming the decoded HOA data to speaker driver signals for playback.) These include the use of singular value decomposition, SVD, and eigenvalue decomposition, EVD, which are matrix factorization techniques that are applied to an input H matrix that contains the spherical harmonic coefficients which are a large part of the HOA data. The matrix factorization techniques are applied in a way that extracts components that contain foreground sounds (also referred to as direct or predominant sounds) and their associated "spatial components", the latter serving to describe some spatial aspects of the foreground sound components. The extracted foreground sound components and their accompanying spatial components may then be quantized before transmission through the communication link. At the decoding side, the received foreground and spatial components are processed by a reconstruction algorithm to synthesize a recovered H^ matrix.

SUMMARY

Several aspects of the disclosure here are directed to encoding and decoding of HOA data, for purposes of bitrate reduction. In a first aspect, principal components analysis, PCA, or any linear transform is performed based on an input H matrix which produces a spatial descriptor, SD, also referred to as one of the Wi components, where i=1, 2, . . . N_sc. An SD component Wi describes spatial aspects of an associated, or ith, salient audio component, such as its direction of arrival and its diffuseness. The PCA or linear transform may be performed directly upon a zero mean covariance matrix, where the latter was computed for the result of a column-wise mean vector subtraction from the input H matrix. The column-wise mean vector subtracted H matrix may be referred to here as the H~ matrix. A salient component (SC) extraction process is then performed using the SD and the H~ matrix, which produces N salient audio components Xi=H~*Wi where i=1, 2, . . . N_sc. The resulting Xi and Wi may then be quantized for transmission to the decoding side. Here, it is recognized that in order to accurately synthesize (at the decoding side) a recovered H matrix (also referred to as the H^ matrix), the column-wise mean vector should also be available at the decoding side where it is used by a reconstruction algorithm (e.g., by adding the mean vector to a product of recovered Xi and recovered Wi) to generate the recovered (synthesized) HOA matrix.

In a second aspect, the PCA based coding technique of the first aspect is modified so that the column-wise mean vector need not be transmitted to the decoding side, which advantageously reduces the required codec bandwidth. In particular, the salient component extraction is modified at the encoding side to use the input H matrix directly, instead of using the column wise mean subtracted H~ matrix, when extracting the salient components Xi. Using this approach, the synthesis (performed in the decoding side) computes an accurate H^ matrix despite not having access to the column wise mean vector.

In a third aspect, the encoding side can dynamically (e.g., while transferring streaming audio content to the decoding side) transition between PCA encoding with mean vector transmission (first aspect) and PCA encoding without mean vector transmission (second aspect). The resulting transmission (e.g., encoded audio content bitstream) contains a flag associated with an encoded segment, that indicates which coding aspect was used to generate the Xi and Wi that are in that segment. The dynamic transition decision between the two aspects may be based on the audio content, e.g., based on metadata associated with the input HOA matrix. In the decoding side, the process looks for the received flag and depending on the flag being set or not decides whether or not to add the mean vector to a product of the recovered Xi and recovered Wi.

Additional aspects of the disclosure here for encoding and decoding HOA data include several spatial descriptor quantization techniques, described below in detail. Those aspects are not limited to any particular analysis operation, as they could operate with not only PCA but also other linear transform analysis algorithms such as SVD and EVD matrix factorization algorithms.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

FIG. 10 shows a chart of SD groups in the encoded audio content in the resulting bitstream of FIG. 9.

FIG. 11 shows example salient component groups that correspond to the SD groups in the example of FIG. 10.

FIG. 13 shows an example of the bitstream of an SD quantization technique in which an SD component produced for a given sub-band is re-used or copied for another sub-band (of the same SD group.)

FIG. 14 illustrates an example of the bitstream of an SD quantization technique in which a spatial descriptor covers a merged sub-band.

FIG. 15 shows an example of the bitstream of an SD quantization technique in which sub-band bandwidth varies across SD groups.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

PCA Based HOA Encoding and Decoding

Figure 1:
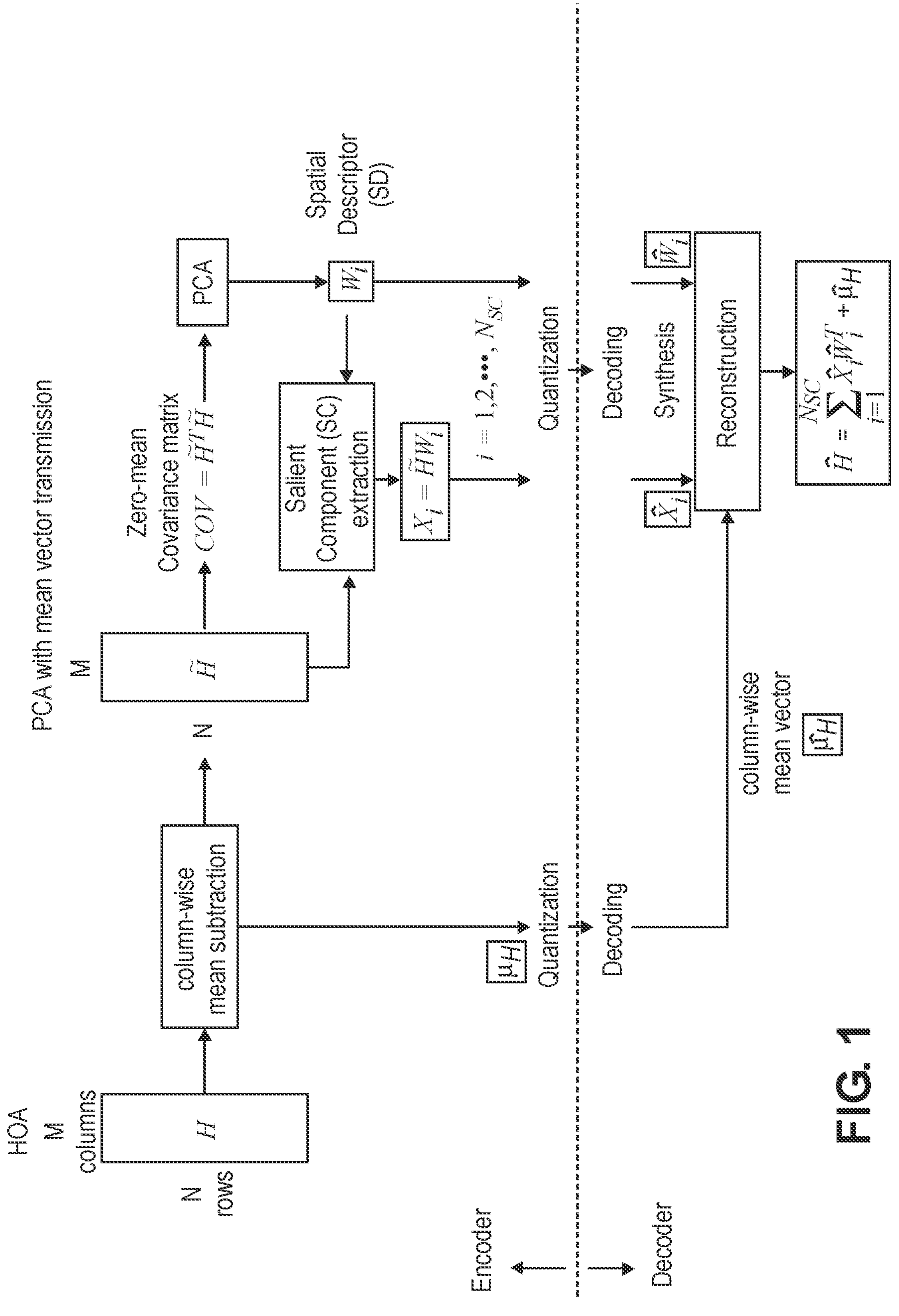
FIG. 1 is a block diagram of an encoding system and a decoding system that uses PCA with mean vector transmission and an associated encoded audio content bitstream.

FIG. 1 is a block diagram of higher order ambisonics data, HOA data, encoding system and decoding systems that uses principal components analysis, PCA, with mean vector transmission to reduce the bitrate of the resulting encoded audio content bitstream while maintaining sound quality upon playback of the bitstream. The elements of these systems are digital electronics such as one or more processors (generically referred to here as "a processor") that are configured for example according to instructions stored in memory to perform certain digital signal processing operations described below. An encoder or encoding side produces an encoded audio content bitstream that may be transmitted, to be carried for example over the Internet or any communications link that may experience bandwidth fluctuations or that may have limited bandwidth, to a decoder or decoding side. The encoding side may be for example part of a system having a number of microphones by which a sound field is captured and then formatted as HOA data. The decoding side may be part of a playback system having sound output transducers or speaker drivers (e.g., loudspeakers, headphones) through which the HOA data is output as sound after being decoded and converted into the appropriate speaker driver signals.

The encoding method includes subtracting a mean vector from an input HOA matrix, H, to compute a mean subtracted HOA matrix, H~. Here, H may be a matrix having N rows and M columns, where the number of columns represents the number of HOA coefficients where the HOA order is sqrt (M)−1 (greater number of columns means a higher order.) The width of the input HOA matrix depends on the order of the HOA representation (e.g., the number of column vectors in the matrix depends on the order of the HOA representation). The number of elements in each column vector is governed by the sampling rate in the case where the matrix is a time domain representation, or by the sub-band domain or frequency domain resolution, e.g., the total number of sub-bands that cover the full audio bandwidth. As to the mean vector, it may be a row vector in which each element of the row vector may be an average of a corresponding column in the input HOA matrix. Note here that H~ may be the same size as H.

Next, a spatial descriptor, SD, is produced by performing principal components analysis, PCA, based upon the mean subtracted HOA matrix. An SD is represented by in the figures by Wi where i=1, 2, . . . , Nsc and Nsc is the total number of salient components (SCs) that are to be extracted from the mean subtracted HOA matrix. An SD, Wi, describes spatial aspects of a corresponding, or ith, salient component, such as its direction of arrival and its diffuseness. In this case, the total number of SDs is equal to the total number of corresponding, salient components. A salient component is an audio signal, and is represented in the figures by Xi; it may be extracted by solving the equation H~*Wi.

Finally, the encoding method includes associating the salient component Xi and the spatial descriptor Wi with the mean vector, e.g., by formatting all of them into an output encoded audio content bitstream. Note here that the salient components (Xi vectors) are essentially audio signals and as such may be encoded, separately from their associated SDs, for bitrate reduction using any suitable audio signal encoding technique, e.g., AAC, when being formatted into the bitstream. Similarly, the spatial descriptors may also be bit-rate reduced by any suitable quantization technique (when being formatted into the bitstream), taking into account the trade-off between quality and bitrate, e.g., coarse quantization in situations where lower playback quality is tolerated, fine quantization where higher quality is needed despite the requirement there for a greater bitrate.

The analysis operation may be performed by determining a zero mean covariance matrix using the mean subtracted HOA matrix, and PCA is then performed upon the zero mean covariance matrix as shown in the figure. The zero mean covariance matrix may be determined by multiplying a transpose of the mean subtracted HOA matrix by the mean subtracted HOA matrix as shown in the figure. The analysis operation results in the spatial descriptors Wi as mentioned above. And then a salient component is extracted for each SD by multiplying the SD and the mean subtracted HOA matrix, as shown in the figure. This operation is repeated for Nsc spatial descriptors, to extract Nsc salient components, where Nsc<M achieves bitrate reduction.

FIG. 1 also illustrates a decoding side process, or a method for decoding the HOA data that is received in the bitstream. The received bitstream contains a salient component and a corresponding spatial descriptor, SD, wherein the SD was produced by performing principal components analysis, PCA, based upon a mean subtracted HOA matrix. Also received in the bitstream is a mean vector (that was used to compute the mean subtracted HOA matrix at the encoding side). An HOA matrix is now computed, by multiplying the salient component with the SD, and adding the mean vector (depicted in the figure as mu^_H). In the context of vectors, the multiplication may be viewed as a matrix multiplication of the salient component (vector) and the SD (vector).

In one aspect, the mere presence of the mean vector in the bitstream is interpreted by the decoding side process as an instruction to add the mean vector, when computing an HOA matrix. In another aspect, the received bitstream contains a flag, wherein the flag controls whether or not the mean vector is used (in the decoding side) for computing the HOA matrix.

Figure 2:
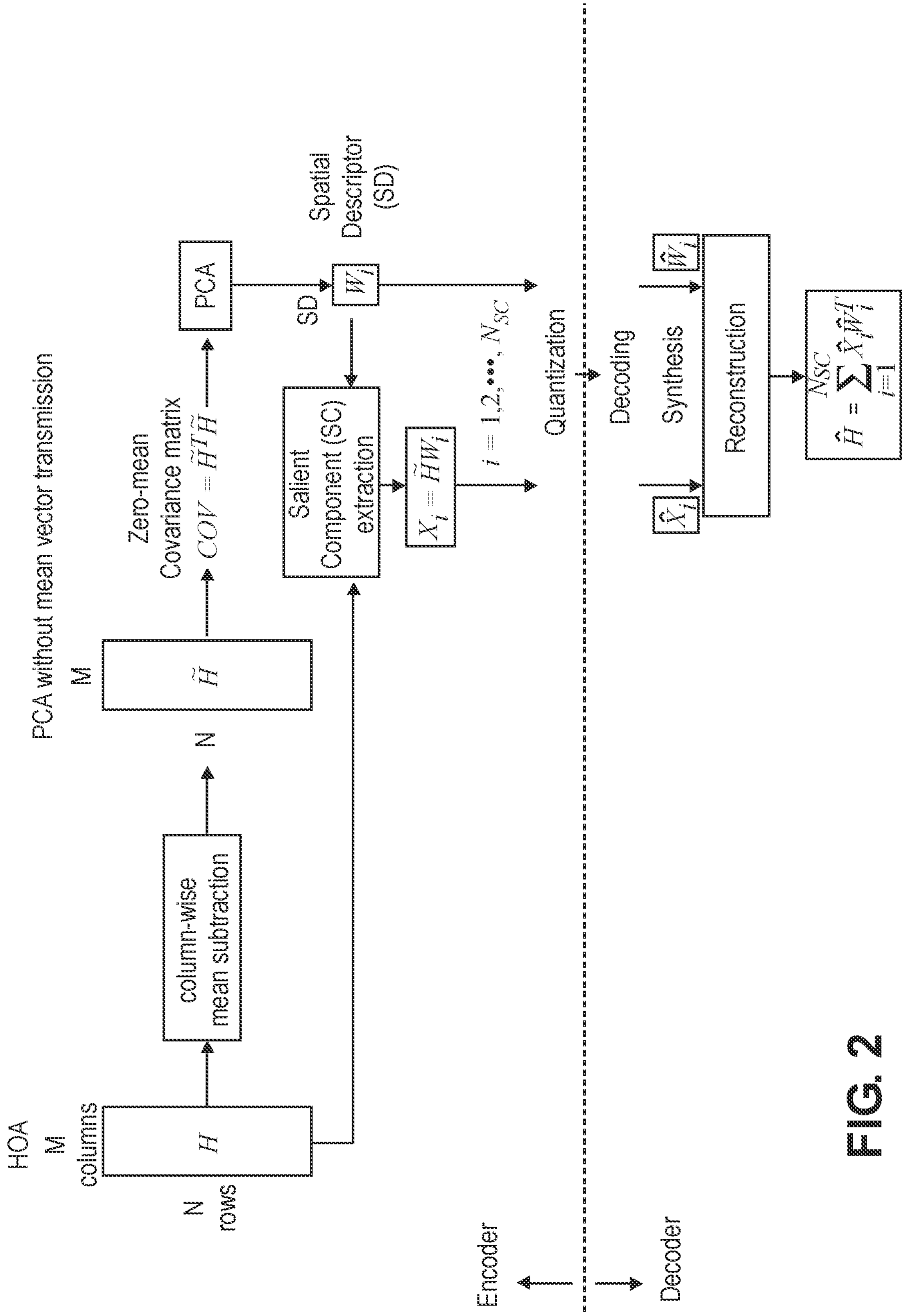
FIG. 2 shows encoding and decoding systems that uses PCA without mean vector transmission in the associated bitstream.

Turning now to FIG. 2, this figure shows HOA data encoding and decoding systems that use PCA but without mean vector transmission in their associated bitstream. Similar to FIG. 1, the encoding here uses PCA, starting with subtracting the mean vector (e.g., a column-wise mean vector) from the input HOA matrix to compute the mean subtracted HOA matrix, and then producing a spatial descriptor, SD, by performing principal components analysis, PCA, based upon the mean subtracted HOA matrix. A difference here is that the salient component is extracted directly from the input HOA matrix H using the SD, rather than from the mean subtracted HOA matrix H~. Thus, there is no need for the reconstruction algorithm (in the decoding side) to use the mean vector when producing the synthesized HOA matrix HA, as shown in the figure. As a result, the mean vector need not be transmitted (by the encoding side) in the bitstream, thereby reducing bitrate.

Figure 3:
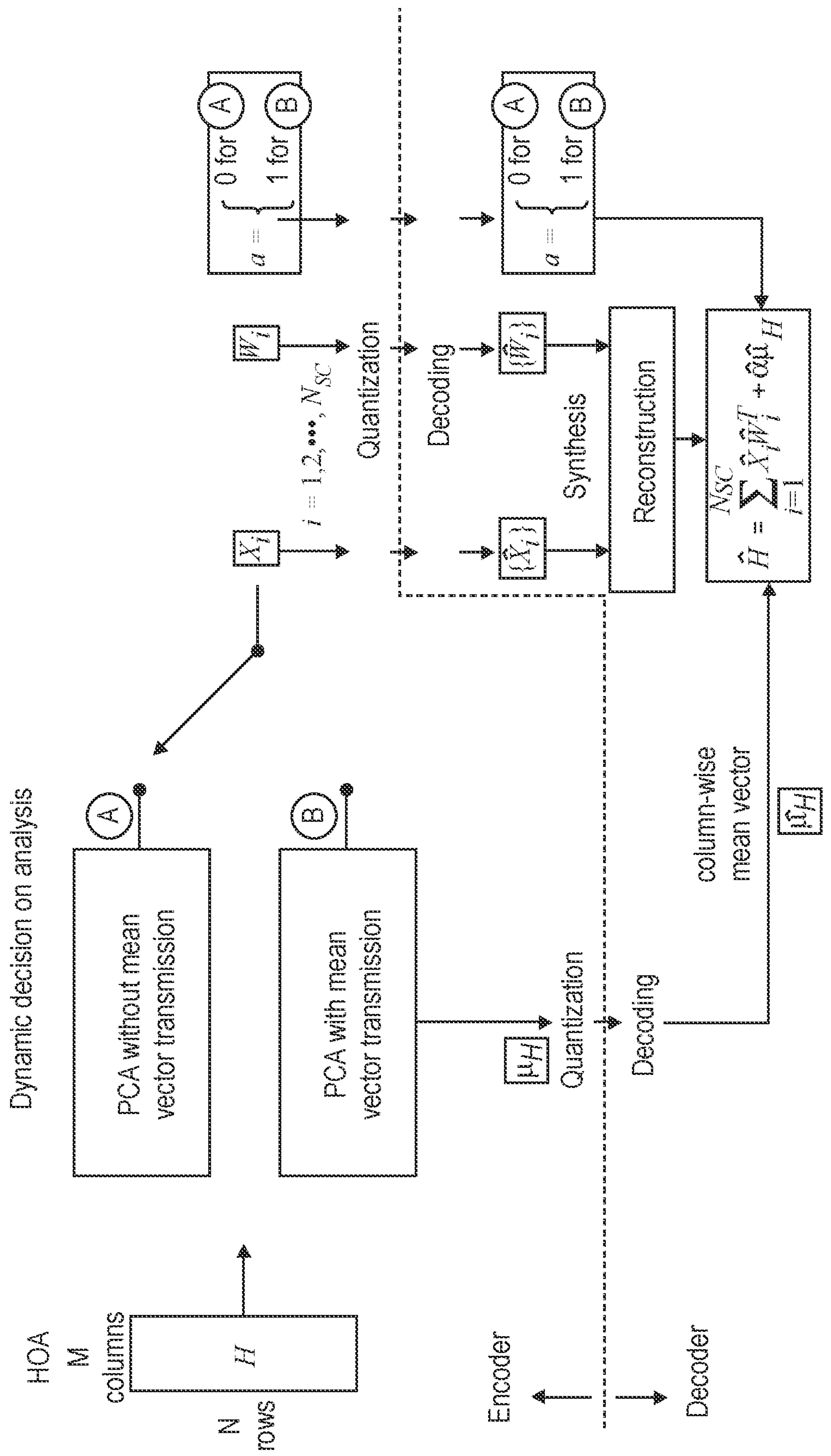
FIG. 3 shows systems that have dynamic decisions for the analysis block and a resulting bitstream.

Referring now to FIG. 3, the encoding system shown here makes dynamic decisions in the analysis block for producing the SD, Xi, between PCA without mean vector transmission (A) and PCA with mean vector transmission (B). In case B, the encoding process then associates the salient component X^i (that was extracted using Wi in the manner described above in connection with either FIG. 1) and its corresponding SD with a mean vector and a flag that is set, into the encoded audio content bitstream. The flag is to be interpreted by a decoding side process as whether or not to use the mean vector for computing (synthesizing) an HOA matrix depending on whether the flag is set or not. In case A, the encoding process proceeds as described above in connection with FIG. 2, and the mean vector flag in the bitstream is not set. If the flag is not set, mean vector does not have to be transmitted in the bit stream.

Multiple Sub-Band HOA Encoding and Decoding

Figure 4:
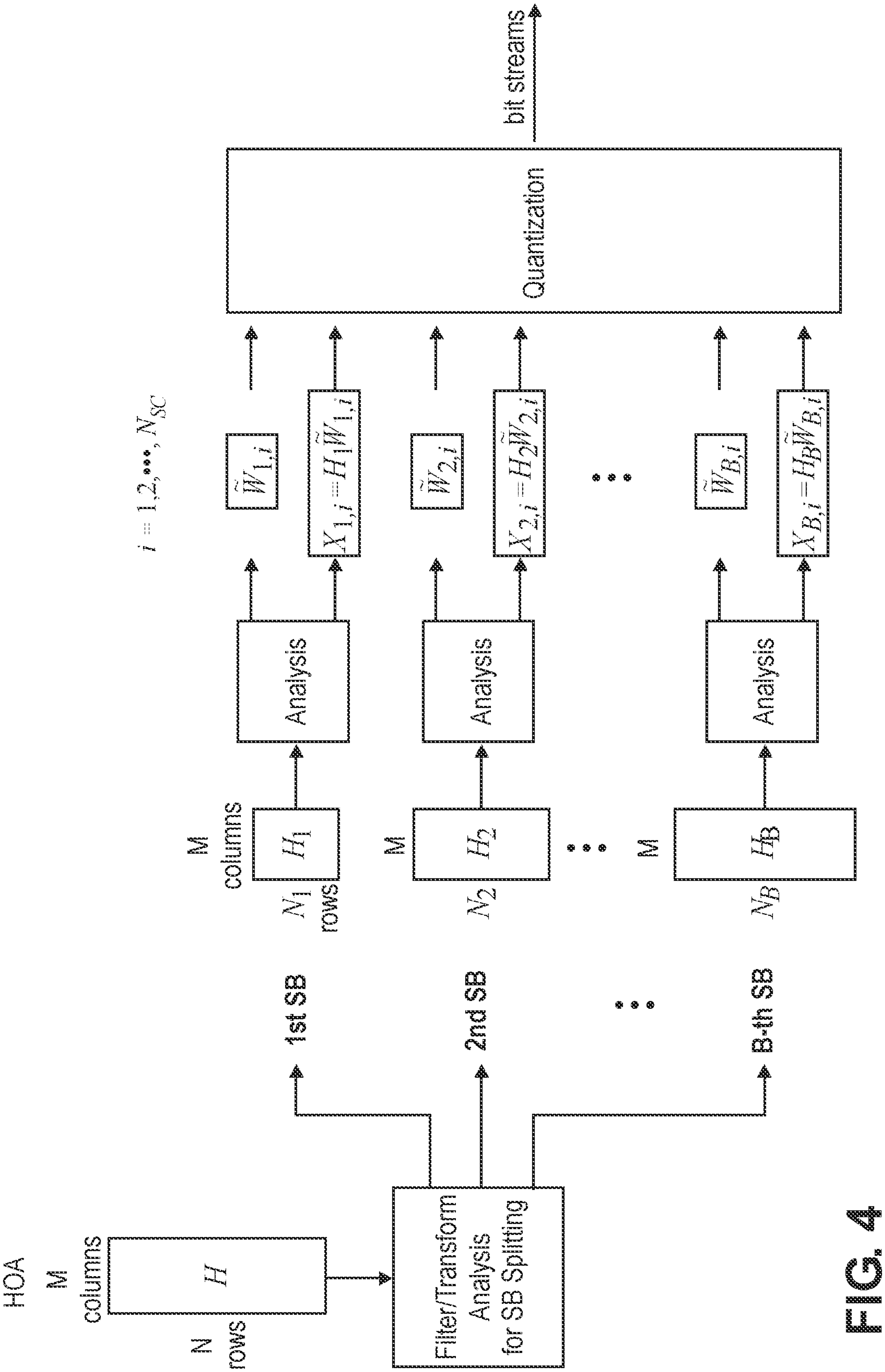
FIG. 4 shows a multiple sub-band encoder and the resulting bitstream.

Turning now to FIG. 4, this block diagram shows a multiple sub-band encoder and the resulting bitstream. The encoding process transforms a wide-band HOA matrix, H, into at least a plurality, B>1, of sub-band HOA matrices, H_1, H_2, . . . H_B. The term "wide-band" as applied to an HOA matrix, a spatial descriptor, or a salient component means that the HOA matrix, the spatial descriptor, or the salient component is given in frequency domain and encompasses at least two sub-bands, e.g., full-band or all sub-bands defined for the full bandwidth of the audio content being encoded, or that the HOA matrix, SD or salient component is given in time domain. The transform that is applied to the wide-band HOA matrix may be a filter bank, short time Fourier transform, discrete cosine transform, or other transformation from time to frequency domain, or it may be sub-band splitting of the wide-band HOA matrix into a number of smaller (narrower bandwidth) sub-bands. Note also that while each of the sub-band HOA matrices still has the same column width, M, as the wide-band HOA matrix, H, the heights (number of rows, or N_1, N_2, . . . N_B) of the sub-band HOA matrices, H_1, H_2, . . . H_B may be different from each other or they may all have the same height. For purposes of the analysis block in this case, the input HOA matrix is one of the sub-band HOA matrices that is restricted to a particular sub-band. Thus, as seen in the figure, a separate analysis operation is performed upon each sub-band HOA matrix, and the resulting SD as well as the corresponding salient component are restricted to the particular sub-band.

Spatial Descriptor Quantization Techniques

Figure 5:
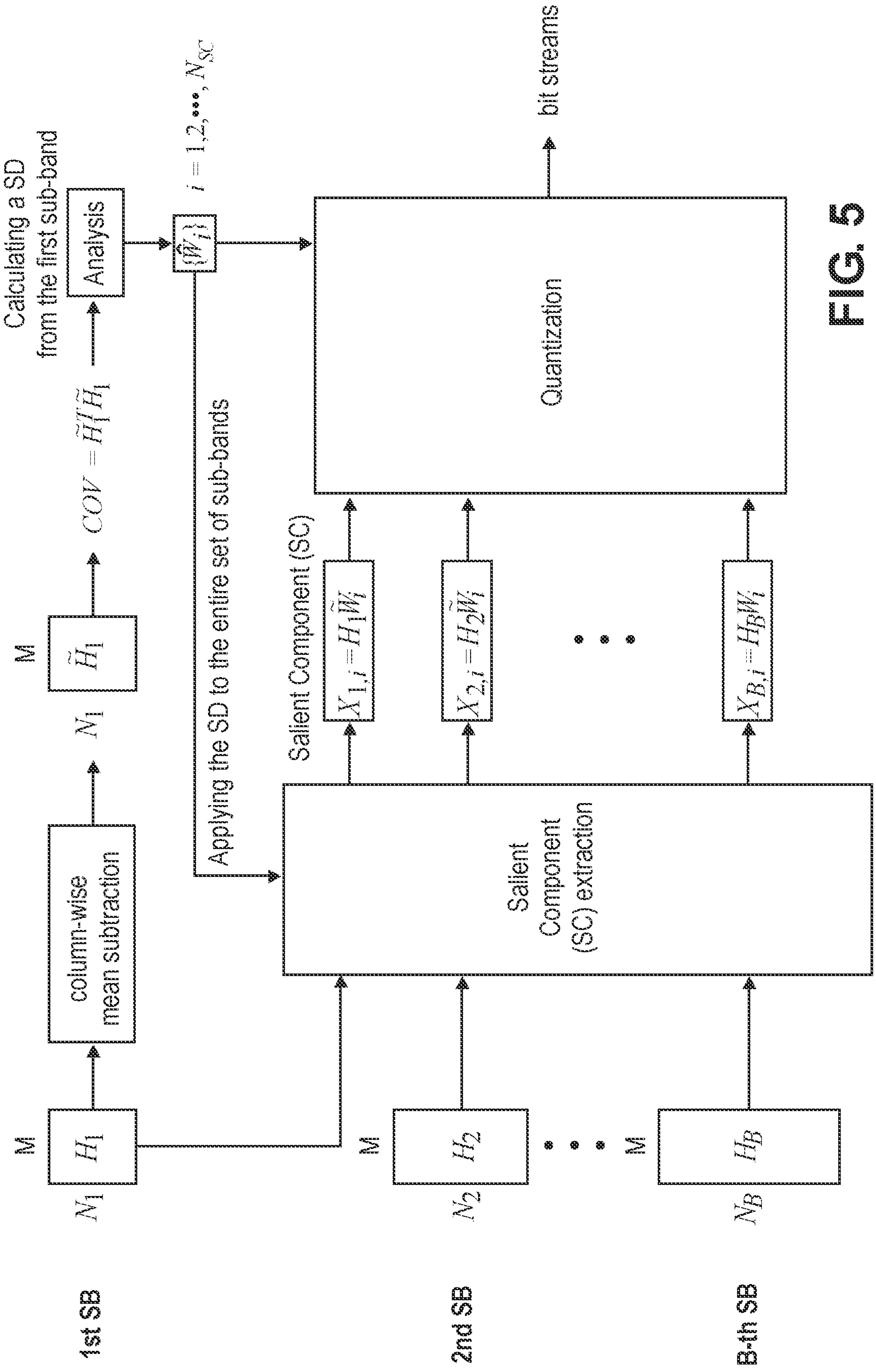
FIG. 5 illustrates a shared spatial descriptor quantization technique.
Figure 6:
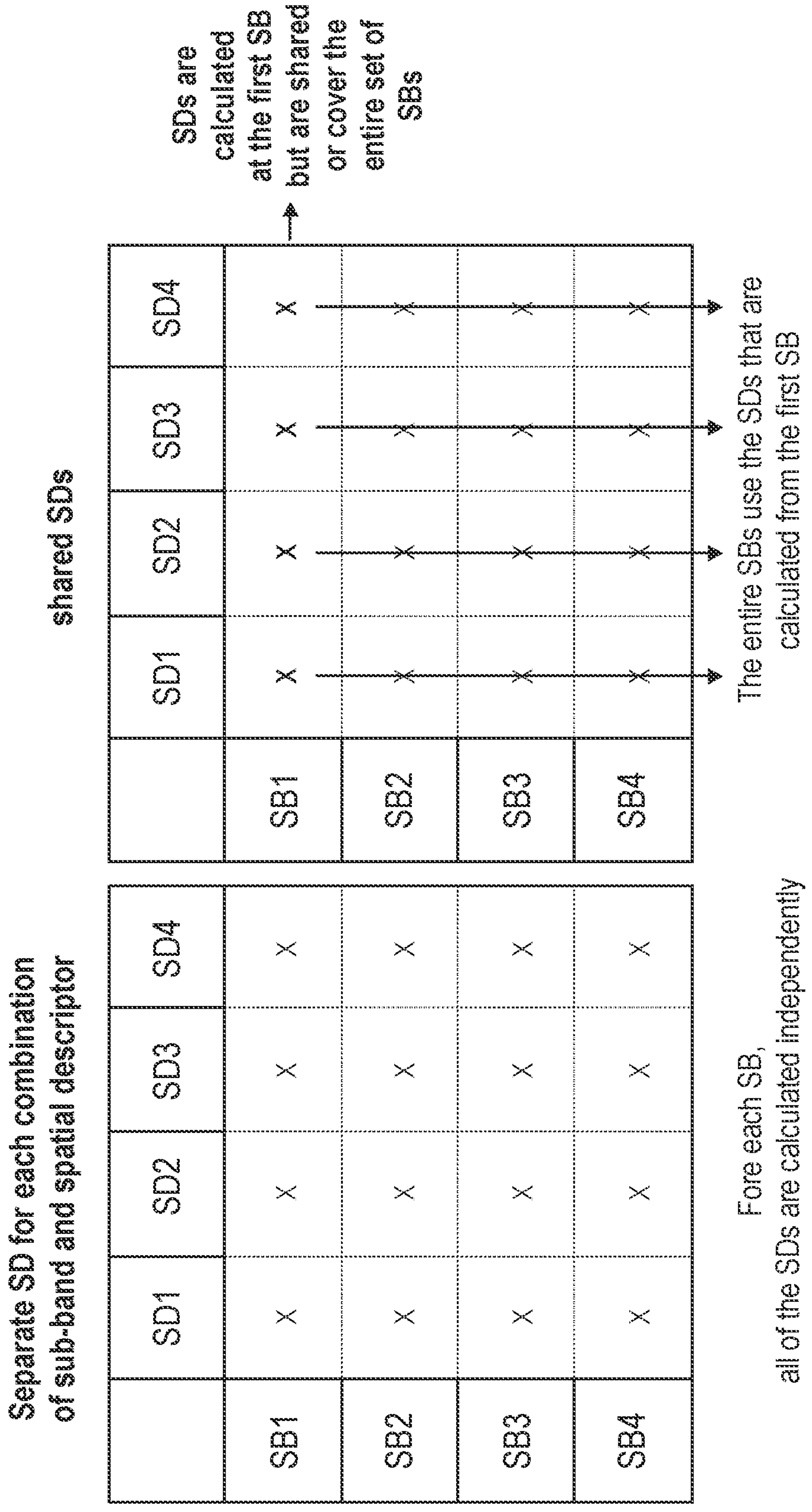
FIG. 6 shows using a graph the concept of the shared spatial descriptor of FIG. 5.

The following sections of this disclosure describe various techniques that reduce the required bits to quantize the spatial descriptors, SDs, that are formatted into the bitstream, resulting in reduced bitrate. Starting with FIG. 5, this figure illustrates a quantization technique in which a single set of SD components are produced by an analysis block, e.g., the PCA technique of FIG. 1, operating upon a single sub-band HOA matrix, H_1. That single set of SD components is then shared by the salient component extraction block which produces the salient components of all sub-bands (that span the full bandwidth of the encoded audio content.) FIG. 6 graphically illustrates this concept, using an example where the full bandwidth of the encoded audio content has been divided into four sub-bands, SB1-SB4 although of course concept is not limited to that example. It can be seen how a single row of SDs that was produced by analysis operation performed upon the sub-band HOA of a single sub-band, here SB1, is re-used for every one of the sub-bands (that span the full bandwidth). In other words, for each sub-band, the set of salient components that are extracted for that sub-band use the "shared" set of SD components of a particular sub-band. The complexity reduction is reflected as a reduced bitrate in the bitstream, because only the set of SD components produced for SB1 are formatted into the bitstream. The bitstream may also contain an instruction to the reconstruction algorithm that is running in the decoder that the set of SD components for SB2, SB3, and SB4 are missing from the bitstream but are the same as those that are in bitstream for SB1.

In accordance with FIG. 5 and FIG. 6, a method for encoding HOA using a shared sub-band domain SD may proceed as follows. A wide-band HOA matrix is transformed into at least a plurality of sub-band HOA matrices, for a plurality of sub-bands, respectively, such as 1, 2, . . . B=4 as shown in the figures. A set of spatial descriptor, SD, components of a first sub-band are produced, wherein the set of SD components of the first sub-band is produced from a first sub-band HOA matrix, of the plurality of sub-band HOA matrices. The set of SD components may be produced by performing principal components analysis, PCA, based upon a mean subtracted sub-band HOA matrix (such as in accordance with FIG. 1 or FIG. 2). There are N components in the set of SD components of the first sub-band, and N components in each respective set of sub-band salient components, where N is two or more. The set of SD components may be the row of N=4 at SB1 shown in the figure, or in other words W_1, W_2, W_4. This set of SD components of the first sub-band are the used to extract, for each sub-band of the plurality of sub-bands, a respective set of sub-band salient components in that sub-band. In the figures, the salient components in SB1 are X_1,*j*, the ones in SB2 are X_2,I, etc. which are extracted using the formula H*W. The respective set of salient components (here, four salient components) for a given sub-band is extracted i) using the set of SD components of the first sub-band and ii) from a respective one of the plurality of sub-band HOA matrices that is for the given sub-band. For example, the salient components X_2,*i* of SB2 are extracted using the formula H_2*W~_i.

Next, the encoding process may continue with formatting i) the set of SD components of the first sub-band and ii) the respective set of sub-band salient components for each of the plurality of sub-bands, into an encoded audio content bitstream. Optionally, the encoding process may also quantize i) the set of SD component of the first sub-band and ii) the respective set of sub-band salient components for each of the plurality of sub-bands, for further bitrate reduction in the bitstream.

A method for decoding HOA data using a shared sub-band domain spatial descriptor that is compatible with the encoding process of FIG. 5 and the concept of a shared SD in FIG. 6 may proceed as follows. The method starts with receiving an encoded audio content bitstream in which there are a set of one or more first sub-band spatial descriptor, SD, components for a first sub-band, and in which a separate set of sub-band SD components for a second sub-band is missing. Thus, referring to the example of FIG. 6, there would be four SD components in the bitstream associated with SB1 but none for SB2 (and in this particular example none for the remaining sub-bands, namely SB3 and SB4.) The method continues with extracting from the encoded audio content bitstream i) the set of one or more first sub-band SD components, ii) a set of one or more first sub-band salient components, and iii) a set of one or more second sub-band salient components. Thus, staying with the example of FIG. 6, four salient components are extracted for SB1 (that correspond to the four SD components associated with SB1 that may also be extracted from the bitstream), and four salient components (not shown) are extracted for SB2. In other words, while four salient components are extracted that are assigned to SB2, the bitstream contains no separate set of SD components that are assigned to SB2. The decoding method continues with a reconstruction algorithm, by computing a first sub-band HOA matrix (a synthesized version of H_1—see FIG. 5) using the first sub-band SD components and the first sub-band salient components; and computing a second sub-band HOA matrix (a synthesized version of H_2—see FIG. 5) using the first sub-band SD components and the second sub-band Salient components.

The decoding method may continue its reconstruction algorithm, by further computing sub-band HOA matrices for all remaining sub-bands of the encoded audio content bitstream using the first sub-band SD components. For example, the synthesized version of H_3 (the sub-band HOA matrix for SB3) is computed using the formula H_3=summation(X_3,*iWi_transpose over i=1, 2, . . . N_sc) where N_sc is the total number of columns in FIG. 6**.

Mixed Domain SD Quantization for HOA Coding

Figure 7:
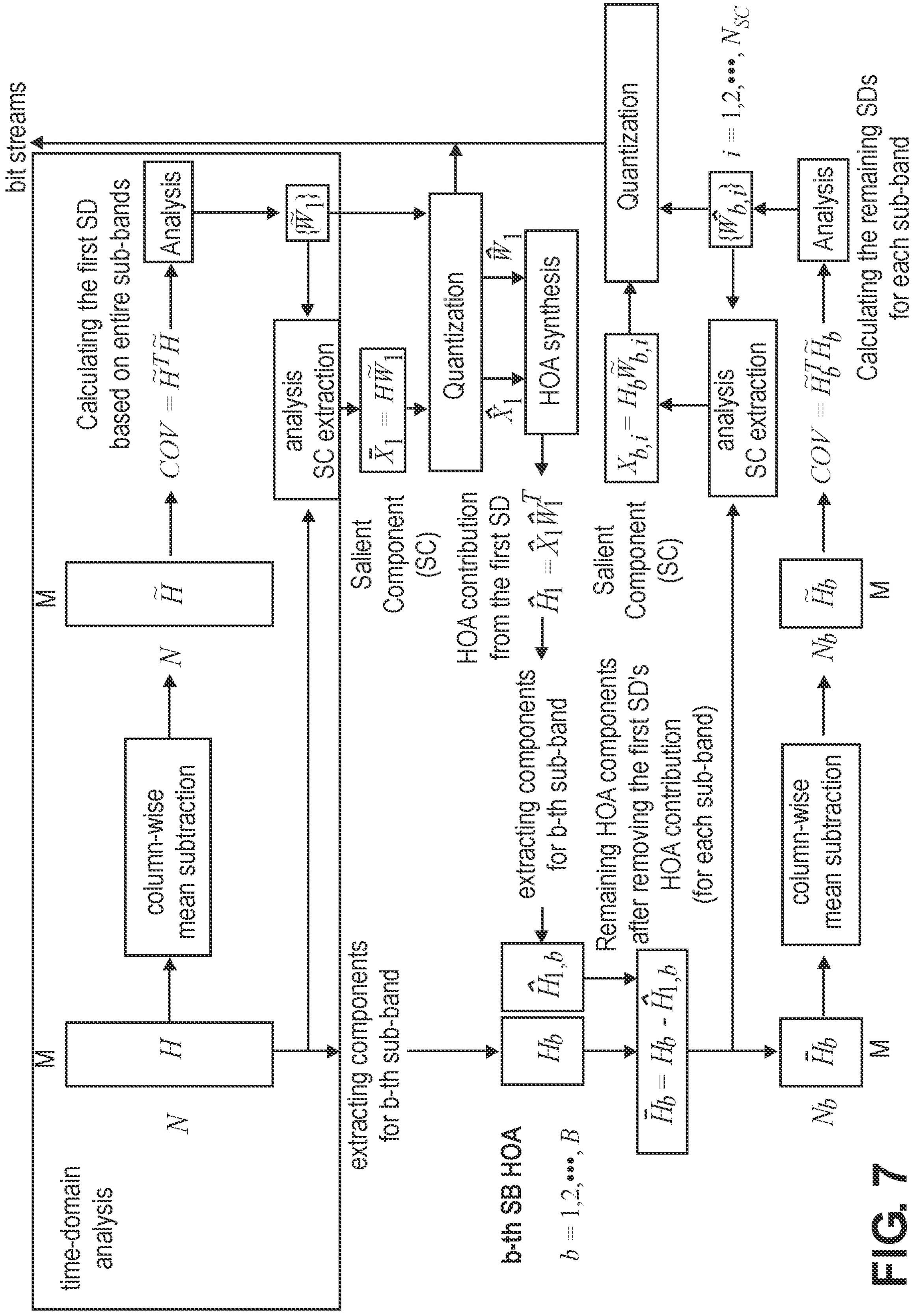
FIG. 7 depicts a mixed spatial descriptor estimation (production) technique.
Figure 8:
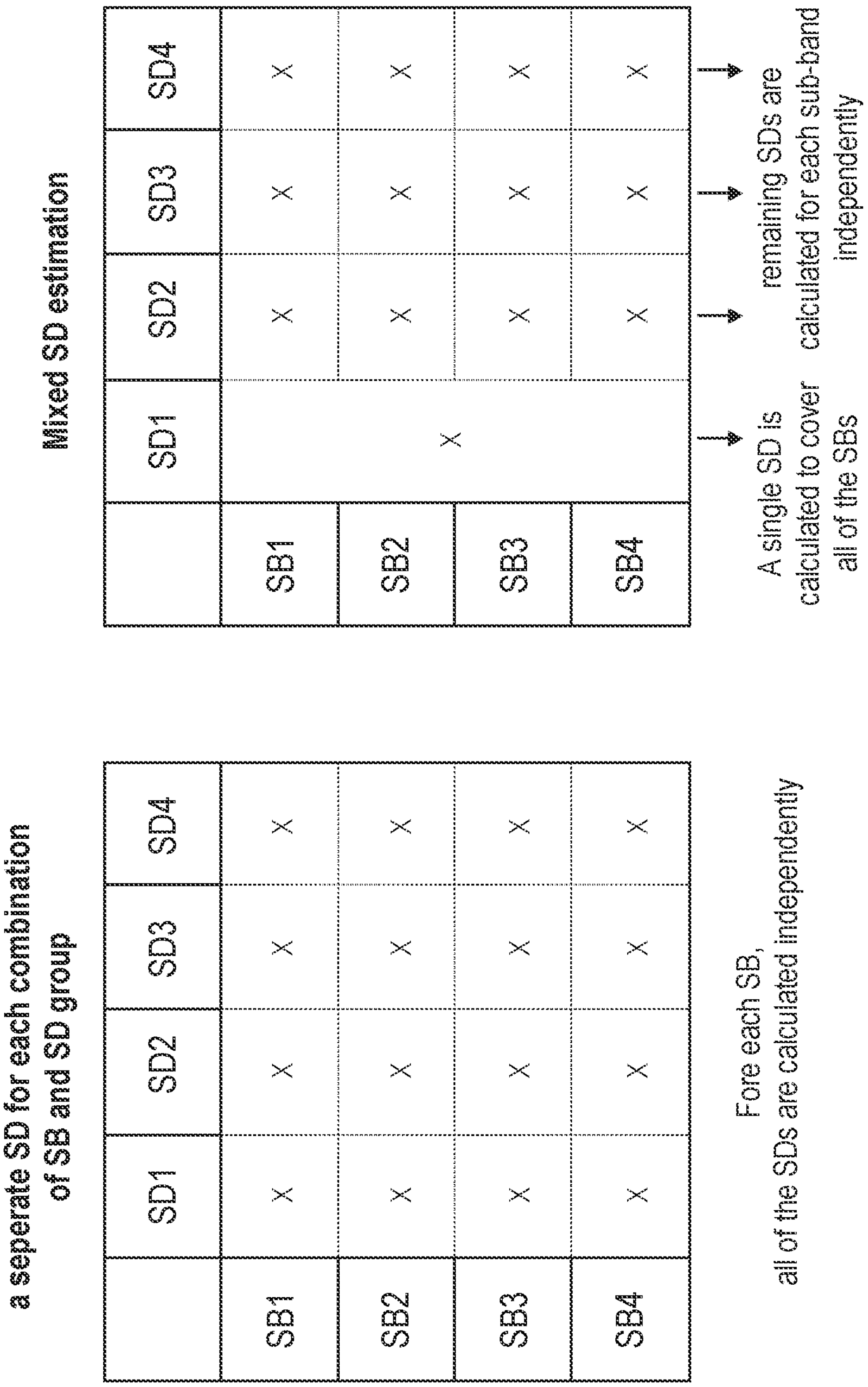
FIG. 8 shows a chart of an example mixed SD estimation technique that may be achieved using the block diagram of FIG. 7 and a chart of a technique in which each SD is estimated individually on a per sub-band basis.

Turning now to FIG. 7 and FIG. 8, these illustrate another HOA data encoding technique in which there is multiple sub-band compression (bitrate reduction). In this SD quantization technique, at least one SD is produced by a time-domain analysis operation and at least one other SD is produced as a set of SD components where each SD component is for a respective or individual sub-band. Thus, referring to the mixed SD estimation chart in FIG. 8, it can be seen that bitrate reduction results from SD1 being a single SD (or single SD component) that "covers" the entire set of sub-bands, e.g., that span the full bandwidth of the encoded audio content in the bitstream, rather being a group of SD components for all of the individual sub-bands. That approach is taken when producing SD2 which is a group of in this example four SDs (or SD components), and for producing the SD3 and SD4 groups. In contrast, the chart on the left of this figure shows that if the SD1 group were produced the same way as the other SD groups (on an individual sub-band basis), then there would be three additional SD components in the SD1 group). Note here that each SD group corresponds to one full-band SC. For example, four SCs derived from the SD2 group can be concatenated into one full-band SC.A method for encoding HOA data in accordance with the mixed domain SD estimation technique of FIG. 7 and FIG. 8 may proceed as follows. The method includes producing a single, wide-band spatial descriptor, SD (e.g., SD1 in FIG. 8) by analyzing an input HOA matrix. Any one of the techniques described above for linear transform analysis (e.g., PCA, SVD, EVD) may be used, and in particular the wide-band SD may be produced by performing a time domain analysis operation based on the input HOA matrix. Next, the wide-band SD is used to extract a wide-band salient component from the input HOA matrix.

Then, for a first sub-band, such as SB1, a set of one or more first sub-band SD components are produced by performing a frequency domain analysis operation based on the input HOA matrix. As seen in FIG. 7, this may involve transforming the (wide-band) input HOA matrix into at least a plurality of sub-band HOA matrices, wherein the set of one or more first sub-band SD components are produced by performing the frequency domain analysis operation upon one of the sub-band HOA matrices that is constrained to the first sub-band. In the example of FIG. 8, that would be the row of SD components at SB1. Finally, for the first sub-band, the method includes extracting from the input HOA matrix a set of one or more first sub-band Salient components using the set of one or more first sub-band SD components. A similar process may be performed for additional sub-bands, such as by producing a set of one or more second sub-band SD components for sub-band SB2 (in FIG. 8, these are the components of SD2, SD3, and SD4 that are in the row SB2) and using the set of one or more second sub-band SD components to extract from the input HOA matrix a set of one or more second sub-band salient components. And of course, the encoding method may also include producing the resulting output bitstream by formatting the wide-band spatial descriptor, the wide-band salient component, the set of first sub-band SD components, the set of first sub-band salient components, the set of second sub-band SD components, the set of second sub-band salient components, etc. into an encoded audio bitstream.

In other words, still referring to FIG. 8, a first SD (vertically oriented SD1, or W~_1 in FIG. 7) is computed that "covers" all of the sub-bands, while the remaining three SDs, which in this case are vertically oriented SD2-SD4 are computed on a per component basis and per sub-band. For example, SD2 is composed of the following components: W~_1,2 in SB1, W~_2,2 in SB2, W~_3,2 in SB3, and W~_4,2 in SB4. SD3 is composed of the following components: W~_1,3 in SB1, W~_2,3 in SB2, W~_3,3 in SB3, and W~_4,3 in SB4. Viewed another way, in the multiple sub-band (SB) HOA compression method described here, at least one single SD is calculated that covers the full bandwidth and other SDs are calculated on a per individual SB basis.

Referring to FIG. 7, this block diagram shows how a single SD, a vector W~_1 having a height of N rows, is calculated in time-domain from the input HOA matrix H, and its contribution is then removed from a target sub-band HOA_b to yield a residual sub-band HOA Hbar_b. Subsequent SDs, W~_b,i are calculated from the residual HOA as shown.

A method for decoding HOA data using both wide-band and sub-band spatial descriptors that is compatible with the encoding process of FIG. 7 and the concept chart on the right side of FIG. 8 may proceed as follows. The method begins with receiving an encoded audio bitstream that contains a time-domain spatial descriptor, a (corresponding) time-domain salient component, a set of one or more first sub-band spatial descriptor, SD, components (also referred to as a first SD group, or SD1 in FIG. 8), and a (corresponding) set of one or more first sub-band salient components. A contribution to an HOA matrix is then computed, using the time-domain spatial descriptor and the time-domain salient component, e.g., in accordance with the equation for the synthesized HOA matrix H^ in the reconstruction algorithm shown in FIG. 1 or FIG. 2. A first sub-band HOA matrix is also computed, using the set of one or more first sub-band SD components and the (corresponding) set of one or more first sub-band salient component, e.g., in accordance with the equation for the synthesized HOA matrix H^_1=X^_i *W^_1 transpose shown in FIG. 7.

Staying with the example of FIG. 8, the decoding method may further receive in the encoded audio bitstream a set of one or more second sub-band spatial descriptor, SD, components for a second sub-band (in this example, the row of SD components at SB2 starting at SD2 and then at SD3 and SD4. In addition, the bitstream will contain a (corresponding) set of one or more second sub-band salient components for the second sub-band SB2. The method includes computing a second sub-band HOA matrix using the set of one or more second sub-band SD components and the set of one or more second sub-band salient components.

More generally, the decoding method includes receiving in the encoded audio bitstream a plurality of sets of one or more sub-band SD components for a plurality of sub-bands, respectively, wherein the plurality of sub-bands together span a full bandwidth of a sound program represented by the HOA data. Thus, in the example of FIG. 8, there is a set of sub-band SD components starting with the column at SD2 along the row at SB2, another set of sub-band SD components starting with the column at SD2 but along the row at SB3, and so on until the row at SB4. In addition, the method includes receiving in the encoded audio bitstream a plurality of sets of one or more sub-band salient components for the plurality of sub-bands, respectively, or in other words a set of salient components corresponding to each row of SD components (starting with SD2.) Finally, the method includes computing a plurality of sub-band HOA matrices using the plurality of sub-band SD components and the plurality of sub-band salient components, wherein the plurality of sub-band HOA matrices together span the full bandwidth of the sound program.

In another aspect of a decoding method that is compatible with the arrangement in FIG. 7, the received bitstream contains one time-domain SD and a corresponding time-domain SC, in addition to N_SC SD groups (i=1, 2, . . . , N_SC) and each SD group is divided into B sub-bands (b=1, 2, . . . , B). The decoding method obtains the "final" synthesized HOA (based on the compatible concepts in the encoding method of FIG. 7) by X^hat_final=X^hat_1+concatenating sub-bands (b=1, 2, . . . B) as sum_{i=1}^{N_SC} X^hat_{b,i}. The X^hat_final may then be rendered into loudspeaker or headphone driver signals for playback.

Sub-Band Dependent Number of Spatial Descriptors for HOA Coding

Figure 9:
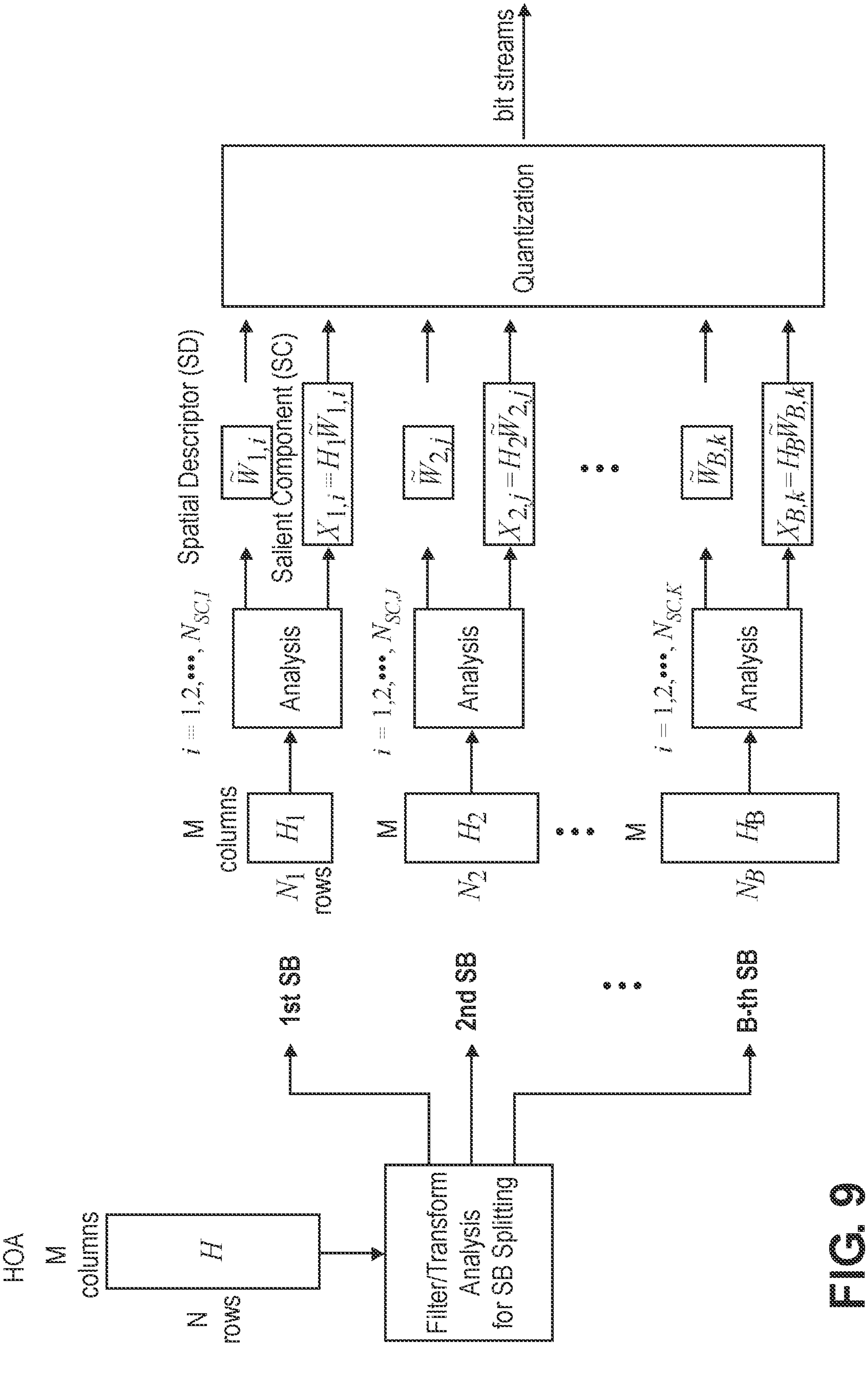
FIG. 9 depicts another SD quantization encoding technique in which different numbers of SD components are produced for different sub-bands.

In another technique for reducing the bitrate of the spatial descriptors, rather than producing and formatting into the bitstream the same number of sub-band spatial descriptor, SD, components for each sub-band as shown in the left hand chart of FIG. 10, the number of sub-band SD components that are produced and formatted into the bitstream varies as a function of sub-band index as seen in the right hand chart of FIG. 10. This codec technique thus allows the encoded number of SD components associated with each sub-band to vary, on a per sub-band basis. This is represented in FIG. 9 by the different sub-band indices i, j, k. The first sub-band (which may be an arbitrary sub-band) has index i and may have for example four SD components computed for it by an analysis operation, corresponding to i=1, 2, 3, and 4 (N_sc, I=4). The second sub-band (which may be an arbitrary sub-band different from other sub-bands, such as SB4) has index j and has for example two SD components, corresponding to j=1 and 2 (N_SC,J=2).

As an example of the process for encoding and decoding sub-band dependent SDs based on at least two sub-bands, consider the arrangement shown in FIG. 10 that shows four sub-bands. When generating the salient components (in the encoding side of such a process), a different number of salient components are extracted for each sub-band. Thus, in the example of FIG. 10, for the first sub-band, four SD components (in four columns, respectively) are produced and accordingly four salient components are extracted for the first sub-band, whereas for the second sub-band only three SD components are produced (and accordingly only 3 salient components are extracted.) In other words, each sub-band is described by a different number of SD components and a corresponding different number of salient components. What this means is that while SD group #1 and SD group #2 are full-band (each has components in all four sub-bands which in this example may be assumed to span the full bandwidth of the sound program being encoded), SD group #3 is not full-band (it is missing a component in sub-band 4) and neither is SD group #4 (it is missing components in sub-bands 2 and 4). A missing SD component is essentially omitted from the encoded audio content bitstream, thereby reducing the bitrate of the bitstream.

A method for encoding HOA data by producing a variable number of spatial descriptors for different sub-bands may proceed as follows (while referring to the example of FIG. 9 and FIG. 10). The method includes transforming an input HOA matrix H (having N rows and M columns) into at least a plurality of sub-band HOA matrices H_1, H_2, . . . A first sub-band HOA matrix is analyzed, e.g., using PCA, SVD, or EVD, to produce a first number of one or more spatial descriptor, SD, components, e.g., in FIG. 10, the row of SD components at SB1. Also, a first number of one or more salient components are extracted, using the first number of SD components. Furthermore, a second sub-band HOA matrix is analyzed to produce a second number of one or more SD components, e.g., in FIG. 10 the row of SD components at SB2. A corresponding second number of one or more salient components are extracted, using the second number of SD components. The second number is different than the first number, e.g., in FIG. 10, there are 3 SDs for SB2, and 4 for SB1. The method continues with formatting the first number of one or more SD components, the second number of one or more SD components, the first number of one or more salient components, and the second number of one or more salient components into an encoded audio content bitstream. Now, if the first number of SD components is greater than the second number, the method further comprises inserting information into the bitstream that indicates (to the decoding side) that a fewer number of SD components and a fewer number of salient components are encoded for the second sub-band than for the first sub-band. In the example of FIG. 10, the absence of two SD components in SD group #4, and one SD component in SD group #3, yields a bitrate reduction in the bitstream because i) no bits are used in the bitstream to encode a missing SD component and a missing salient component for the second sub-band SB2, and ii) no bits are used to encode the missing SD components for the fourth sub-band SB4.

Note that there is further bitrate reduction due to the corresponding, missing salient components, which do not have to be formatted into the bitstream. This is depicted in the chart on the right side of FIG. 11, where in this example group #4 is missing SDs in SB3 and SB4, while group #3 is missing an SD in SB4, which lead to three missing salient components that do not have to be coded into the bitstream (hence yielding further bitrate reduction).

In one aspect, referring back to FIG. 9, the first sub-band HOA matrix Hi is constrained to a low frequency band and the second sub-band HOA matrix H_2 is constrained to a high frequency band.

In the decoding side (not shown) of this codec technique that uses a variable number of SDs for different sub-bands, the incoming bitstream is parsed to extract, for a given sound program represented by HOA data, a first number (set) of SD components that are associated with a first sub-band index, and a second number (different set) of SD components that are associated with a second sub-band index, and so on for additional sub-bands. The second number is different than the first number. The reconstruction algorithm proceeds with computing a first sub-band HOA matrix using the first number of one or more first sub-band SD components, and computing a second sub-band HOA matrix using the second number of one or more second sub-band SD components. Furthermore, a third number of one or more third sub-band SD components (represented in the example chart on the right hand side of FIG. 10 by the two SD components in SB4) may be extracted from the bitstream, wherein the first number is greater than the second number which is greater than the third number. Similarly, a third sub-band HOA matrix is computed using the third number of one or more third sub-band SD components. As is the case when a separate SD is produced for each combination of sub-band and SD (shown in the chart on the left side of the FIG. 10), the first number of one or more first sub-band SD components (e.g., the ones in the row of SB1) are constrained to a first sub-band (e.g., SB1), and the second number of one or more second sub-band SD components (e.g., the ones in the row of SB2) are constrained to a second sub-band (e.g., SB2) that is different than the first sub-band.

Staying with the decoding method, that is compatible with the encoding concept in FIG. 10, one way for computing the second sub-band HOA matrix comprises a vector multiplication operation in which a plurality of vector elements that correspond to a missing second sub-band SD component, that is missing in the encoded audio content bitstream because the second number of SD components are fewer than the first number of SD components, are filled with zero. Doing so may reduce the complexity of the decoding method.

Recall that for the reconstruction algorithm, a first number of one or more first sub-band salient components, and a second number of one or more second sub-band salient components, need to also be extracted extracting from the encoded audio content bitstream. A further reduction in complexity may be achieved with this approach, when computing the second sub-band HOA matrix, by multiplying the second number of second sub-band SD components with the second number of salient components while filling with zero a plurality of vector elements that correspond to a missing second sub-band salient component which is missing because the second number of second sub-band salient components are fewer than the first number of first sub-band salient components.

Figure 12:
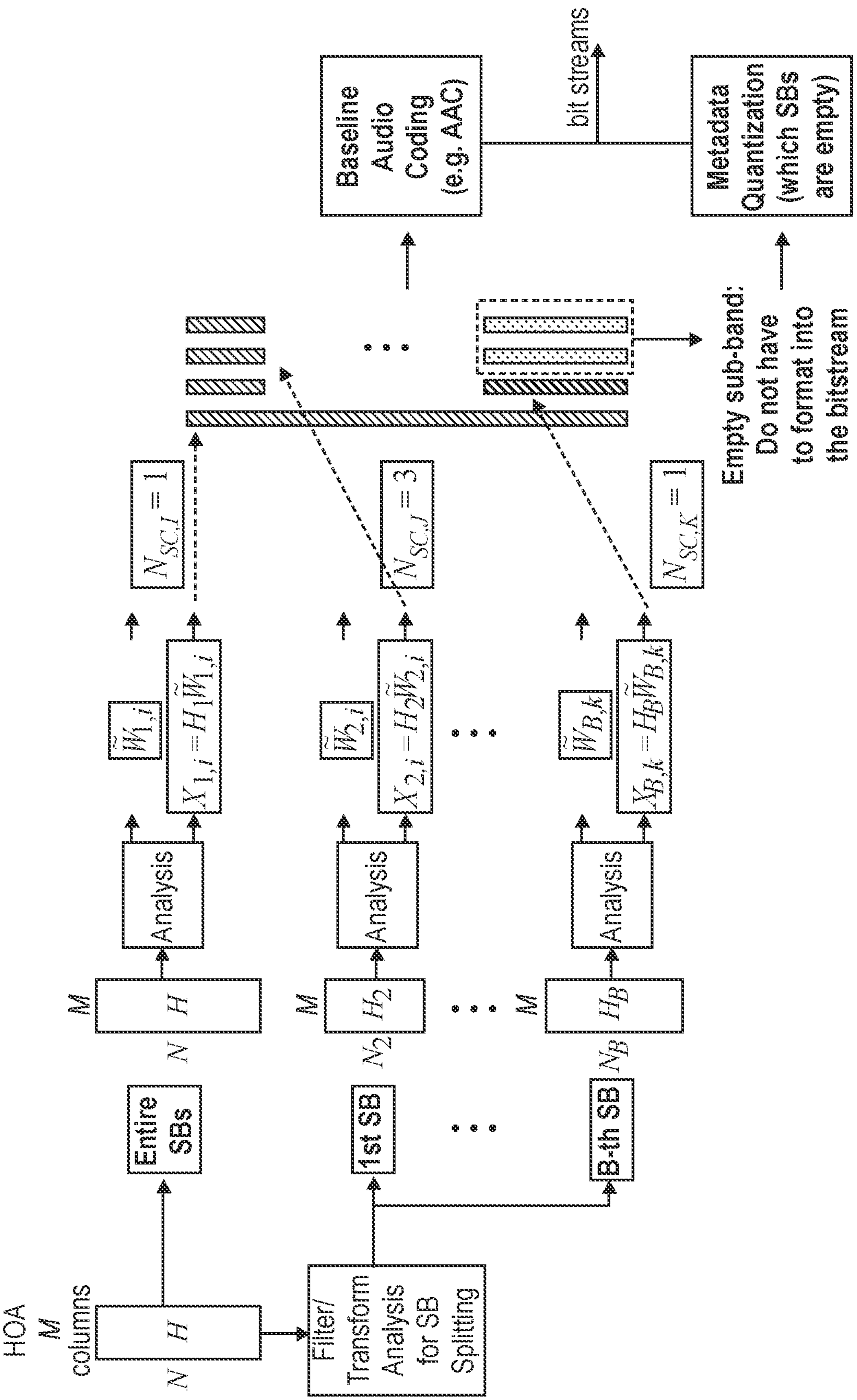
FIG. 12 depicts the SD quantization encoding technique in which different numbers of SD components are produced for different sub-bands along with the associated band-limited salient components (SCs).

Referring now to FIG. 12, this is a block diagram of an encoding process that can produce different numbers of salient components for different sub-bands as shown in the right hand chart of FIG. 10, combined with the idea from FIG. 7 and FIG. 8 that at least one of the SDs is produced based on the full bandwidth. In other words, this method is producing both wide-band and sub-band spatial descriptors. Recall that a missing SD component W as described in connection with FIG. 10 leads to a corresponding, missing salient component X, when computing the salient component X using the equation X_B,k=H_B*W~_B,k Now, the encoding process begins with a so-called "wide-band analysis" operation being performed on a wide-band input HOA matrix, matrix H, that may encompass all sub-bands (e.g., that span the full bandwidth of the encoded audio content in the bitstream.) This yields a wide-band spatial descriptor W_1,1 which is then used to extract a wide-band, e.g., full bandwidth, salient component X_1,1. The analysis may be in frequency domain performed upon the entire set of defined sub-bands that span the full bandwidth of a sound program, or it may be performed in time domain where the wide-band input matrix is given in time domain format. The resulting salient component X_1,1 is represented in the figure by a vertical bar which spans the entire set of sub-bands 1, 2, . . . B or the full bandwidth of the sound program (that is represented by the HOA data.)

In addition, another analysis operation is performed, on a per sub-band basis for example after transforming the wide-band HOA matrix H into at least several sub-band HOA matrices H_2, H_3, H_B, noting again that the heights N_2, N_3, N_B of the sub-band HOA matrices may be different from each other. Next, it is determined whether or not some of these sub-band spatial descriptors and their corresponding salient components may be omitted from the encoded bitstream. When such processing is complete for all desired sub-bands, for example resulting in the table shown on the right side of FIG. 11, it can be seen that the analysis has produced a first spatial descriptor group, SD group #1 having four components in four sub-bands, respectively, which leads to a corresponding full-band salient component, SC, group #1 having four components in the four sub-bands (as shown in the column for SC group #1). Similarly, the wide-band analysis portion has also produced SC group #2. Each of the SC groups #1 and #2 may be considered to cover the full bandwidth of the sound program (which in this example is defined by four sub-bands, although more generally two or more sub-bands). But the sub-band analysis for SB3 and SB4 does not yield a complete set of (here, four) spatial descriptor components. In particular, the analysis of SB3 does not yield a component in SD group #4, and the analysis of SB4 does not yield components in SD groups #3 and #4. Accordingly, the equation above for extracting a salient component X does not yield three salient components, as shown in FIG. 12, which are referred to here as being "empty sub-bands". No SD components and no salient components for the empty sub-bands are added into the encoded audio content bitstream, thereby reducing bitrate.

In the decoding side (not shown) of this codec technique, a processor performs a method for decoding HOA data, that has been encoded using a variable number of spatial descriptors for different sub-bands, as follows. The method may begin with receiving an encoded audio content bitstream that comprises a sequence of audio content frames wherein each frame comprises encoded HOA data. The processor extracts from each frame a first number of one or more first sub-band spatial descriptors, and a second number of one or more second sub-band spatial descriptors, e.g., in FIG. 10, 4 SDs in SB3 and 2 SDs in SB4. In addition, the process extracts from each frame the first number of one or more corresponding first sub-band salient components, and the second number of one or more corresponding second sub-band salient components, e.g., 4 salient components in SB3 and 2 salient components in SB4. Then for each frame the processor computes an HOA matrix using i) the first sub-band spatial descriptors and the corresponding first sub-band salient components in that frame, and ii) the second sub-band spatial descriptors and the corresponding second sub-band salient components in that frame. In each frame the first number of first sub-band spatial descriptors can be different than the second number of second sub-band spatial descriptors. Also, the first number of first sub-band spatial descriptors or the second number of second sub-band spatial descriptors can vary on a per frame basis.

Varying Sub-Band Partition for Each HOA Spatial Descriptor (SD) Group

Another aspect of the spatial descriptor, SD, quantization disclosure here is a multiple sub-band (SB) HOA data compression technique in which SB band-width partition is a function of both SD index and SB index. This technique is exemplified in the chart of FIG. 13, where the number of SDs for each SD group varies, and each SD can cover a different SB band-width. More specifically, If an i-th SD group has M SDs that together cover N SBs where M<N, then these SDs as transmitted in the bitstream will leave one or more empty SBs. For example, if three SDs of a group should cover 4 SBs, then to fill the single empty SB slot, a neighbor SD can be assigned to cover both its usual SB slot as well as the empty one. This can be seen in the example of FIG. 13, in SD group #3, where the SD that was actually produced for SB3 is also assigned to the empty slot in SB4.

A method for encoding HOA data by effectively varying the width of a sub-band partition as exemplified in FIG. 13 may proceed as follows. The method includes analyzing a first sub-band HOA matrix, of a plurality of sub-band HOA matrices, to produce a plurality of first sub-band spatial descriptor, SD, components, e.g., the row of three SD components at SB2 (which are part of SD groups #2, #3, and #4. In addition, a second sub-band HOA matrix, of the plurality of sub-band HOA matrices, is analyzed to produce a number of one or more second sub-band SD components, e.g., the row of two SD components at SB3 (which are part of SD groups #2 and #3). An instruction is then set in the encoded audio content bitstream to indicate which one of the plurality of first sub-band SD components, that is assigned to a given SD group, is to be copied as a second sub-band SD component that is assigned to the given SD group. In the example of FIG. 3, the instruction indicates that the SD component in SB2 that is part of the SD group #4 is to be copied as an SD component in SB3 that is assigned to the same SD group #4.

Staying with the example of FIG. 3, there may be a further instruction (set in the bitstream) to indicate that the same SD component, namely the one in SB2 that is part of the SD group #4, is to be copied as an SD component in SB 4 that is assigned to the SD group #4. The method may continue with formatting the plurality of first sub-band SD components into the encoded audio content bitstream, and formatting at least one of the number of one or more second sub-band SD components into the encoded audio content bitstream, wherein a number of second sub-band SD components that are formatted into the encoded audio content bitstream are fewer than a number of the first sub-band SD components that are formatted into the encoded audio content bitstream. This results in "empty sub-band slots" for spatial descriptors in the bitstream, which slots can then be filled by the decoding side in response to the instructions that are received in the bitstream. Bitrate reduction in the bitstream is achieved, due to no bits being used to actually encode separate SD components for the empty sub-bands.

In this aspect, the effective width or bandwidth, or vertical spread when referring to FIG. 13, of SB2 is greater in SD group #4 than it is in SD group #2 and in SD group #3. Also, the width of SB3 is greater in SD group #3 than it is in SD group #2. With respect to the SB2 component of SD group #4, that particular component is produced in the encoding side by analyzing just the second sub-band HOA. Moreover, this SB2 component of SD group #4 is then used by the decoding side as not only the component for SB2 but also the component for SB3 and the component for SB4, when synthesizing the sub-band HOA matrices of SB2, SB3 and SB4.

Moreover, in this aspect, the codec technique is effectively variable band-width splitting, e.g., Bark-scale band splitting, the combined band of SB3-SB4 in SD group #3, into two smaller bands SB3 and SB4 in SD group #2 (in the example chart of FIG. 13). Also, the combined band of SB2-SB4 in SD group #4 is split into three smaller bands SB2, SB3, and SB4 in SD group #2.

The example of FIG. 13 may also be used illustrate the following general aspects of this codec technique. If SD groups A and B have M and N SBs (M<N), respectively, then some SBs in SD group B are said to have been "merged" to generate SBs in SD group A. For example, if SD group A is to have 2 SBs while SD group B has 4 SBs, then the first and second SBs in SD group B can be merged to generate the first SB in SD group A; the third and fourth SBs in SD group B can be merged to generate the second SB in SD group A. Thus, in FIG. 13, SB2-SB4 are merged to become the second sub-band in SD group #4 (and the other sub-band in SD group #4 being SB1).

In another aspect, if SD groups A and B have M and N SBs (M<N), respectively, then each SD group could be split into M and N bark-scale sub-bands, respectively.

In another aspect of the codec technique, referring to FIG. 12 and the example chart of FIG. 13, the encoding process may produce for SD group #1 a time-domain SD that is the result of a single time domain analysis operation having been performed on the wide-band input HOA matrix H. This may also be referred to as analyzing the wide-band input HOA matrix to produce a wide-band spatial descriptor, SD. The method further includes extracting a wide-band salient component using the wide-band SD, and formatting the wide-band SD and the wide-band salient component into the encoded audio content bitstream.

The method in that case would further include transforming the wide-band input HOA matrix into at least a plurality of sub-band HOA matrices, e.g., corresponding to sub-bands SB1-SB4. As a result, four separate frequency domain analysis operations are performed on those four sub-band HOA matrices, in order to produce the four components of SD group #2. Those same four frequency domain analysis operations also produce four components for SD group #3; however only three of them are formatted into the encoded audio content bitstream for SD group #3 because the component for SB4 will be copied from that of SB3, by the decoding side. Similarly, only two of the produced SD components are formatted into the bitstream for SD group #4 because the SD components for SB3 and SB4 will be copied from that of SB2, by the decoding side.

A method for decoding HOA data, that has been encoded with variable width of sub-band partition as a function of spatial descriptor group and that is compatible with the example of FIG. 13 may proceed as follows. The process extracts from an encoded audio content bitstream a plurality of first sub-band SD components (e.g., in row SB2) and at least one second sub-band SD component (e.g., in row SB3), wherein a number of second sub-band SD components that are in the bitstream are fewer than a number of the first sub-band SD components that are in the bitstream (e.g., SB3 has two SD components in the bitstream while SB2 has four. The at least one second sub-band SD component is assigned to a first SD group (e.g. SD group #2). Next, the processor computes a first sub-band HOA matrix using the plurality of first sub-band SD components, and copies, in accordance with an instruction in the encoded audio content bitstream, one of the plurality of first sub-band SD components that is assigned to a second SD group (e.g., SD group #3). Now, the processor also computes a second sub-band HOA matrix (for SB3) using i) the at least one second sub-band SD component that is assigned to the first SD group (group #2) and ii) the copied first sub-band SD component that is assigned to the second SD group (group #3).

In addition, the processor extracts from the encoded audio content bitstream at least one third sub-band SD component (in row SB4) that is assigned to the first SD group (group #2), computes a third sub-band HOA matrix using i) the at least one third sub-band SD component that is assigned to the first SD group and ii) in accordance with an instruction in the encoded audio content bitstream, the copied first sub-band SD component that is assigned to the second SD group (group #3). In addition, the processor could also extract a wide-band SD (e.g., in SD group #1) and a corresponding wide-band salient component, from the encoded audio content bitstream, and computes a contribution to an HOA matrix using the time-domain spatial descriptor and the time-domain salient component.

Turning now to FIG. 14, this chart illustrates using an example a method for encoding higher order ambisonics, HOA, data, by merging sub-bands as a function of spatial descriptor group. References in parenthesis below are to elements of the chart in FIG. 14, as examples only. The following method may be performed to produce a single SD component that covers a merged sub-band and that is assigned to the second SD group (SD group #3), a single SD component that covers only a first sub-band (SB2) and is assigned to a first SD group (SD group #2), and a single SD component that covers only the first sub-band (SB2) and is assigned to a second SD group (SD group #3). As seen in FIG. 14, the SD and SC of SD group #1 are calculated from the full-band HOA input matrix, and may be referred to here as SD_1 and SC_1. Next, a residual HOA matrix is calculated by subtracting the contribution SC_1*SD_1^T from the full-band HOA input matrix, and is split into four, residualized sub-band HOAs in SB1-SB4, respectively. Next, the SDs and SCs for SD group #2 are calculated from these, residualized sub-band HOAs. Then, another residual HOA matrix is obtained by subtracting the contribution from SD group #2, and is then analyzed to obtain the SDs and SCs of SD group #3, where in that case the residual HOA matrix was split into 3 sub-bands, e.g., SB1, SB2 and the merged SB3-SB4. Finally, another residual HOA matrix is obtained by removing the contribution of SD group #3, and it is analyzed to obtain the SDs and SCs of SD group #4, where in that case the residual HOA matrix was split into 2 sub-bands, e.g., merged SB1-SB2 and merged SB3-SB4. The processor sets an instruction in the encoded audio content bitstream to indicate that the merged sub-band covers a second sub-band (SB3) and a third sub-band (SB4). Bitrate reduction is achieved because in SD group #3, a single SD component covers the merged sub-band (instead of two SD components each covering a separate sub-band).

Note that to produce the SD arrangement in FIG. 14, the following analysis operations may be needed: a single wide-band or time domain analysis to produce SD1 (SD group #1); 4 separate frequency domain analysis operations to produce the SD components of SD group #2 in the four sub-bands, which also yields the SD components in SD group #3 in sub-bands SB1 and SB2; a single frequency domain analysis operation to produce the two SD components in SD group #3 and SD group #4 in the merged sub-band; and a single frequency domain analysis operation to produce the two SD components in SD group #4 that are in two different merged sub-bands.

A method for decoding HOA data that has been encoded with merged sub-bands as a function of spatial descriptor group and that covers the example of FIG. 14 may proceed as follows. The method includes extracting, from a received encoded audio content bitstream, a single SD component and a corresponding salient component that cover only a first sub-band and are assigned to a first SD group, a single SD component a corresponding salient component that cover only the first sub-band and are assigned to a second SD group, and a single SD component and a corresponding salient component that cover a merged sub-band and are assigned to the second SD group. The processor, in accordance with an instruction in the encoded audio content bitstream that indicates the merged sub-band covers the second sub-band and a third sub-band, then computes a contribution to an HOA matrix that covers the second sub-band and the third sub-band, using the single SD component and the corresponding salient component that cover the merged sub-band.

Turning now to FIG. 15, this chart illustrates using an example an SD quantization technique (of an HOA data codec) in which there can be a variable number of SD components in each SD group. FIG. 15 is similar to FIG. 14, except that the SB band-width of SD groups #3 and #4 are different than in FIG. 14. Considering the decoding side, the processor extracts, from the received bitstream, several SD groups and their corresponding salient components that are given in frequency domain. The frequency domain spans at least a plurality of sub-bands, e.g., SB1-SB4. The encoded audio content bitstream supports a format in which the total number of one or more SD components in each SD group can vary as a function of SD group. In addition, the bandwidth of each of the one more SD components in a first SD group is different than the bandwidth of each of the one or more SD components in a second SD group. In the case of FIG. 15, it can be seen that the total number of SDs in SD group #2 is 4, while in SD group #3 it is 3, and in SD group #4 it is just 2. That also means that the bandwidth of each of the SD components in group #2 is different than the bandwidth of each of the SD components in group #3. The decoding process continues with computing (synthesizing) an HOA matrix using the SD groups and corresponding salient components that were extracted from the bitstream. The bitrate reduction is achieved here due to the fewer number of SD components in group #3 and in group #4 (relative to the number of SD components in group #2).

To produce the arrangement SD components shown in FIG. 15, the number of analysis operations needed are as follows: a single wide-band or time domain analysis to produce SD group #1; four frequency domain analysis operations in SB1-SB4 to produce SD group #2; to produce SD group #3, three frequency domain analysis operations in three sub-bands that are partitioned differently than SB1-SB4; and to produce SD group #4, two frequency domain analysis operations in two sub-bands that are partitioned differently than SB1-SB4 and differently than the three sub-bands of SD group #3.

Figure 16:
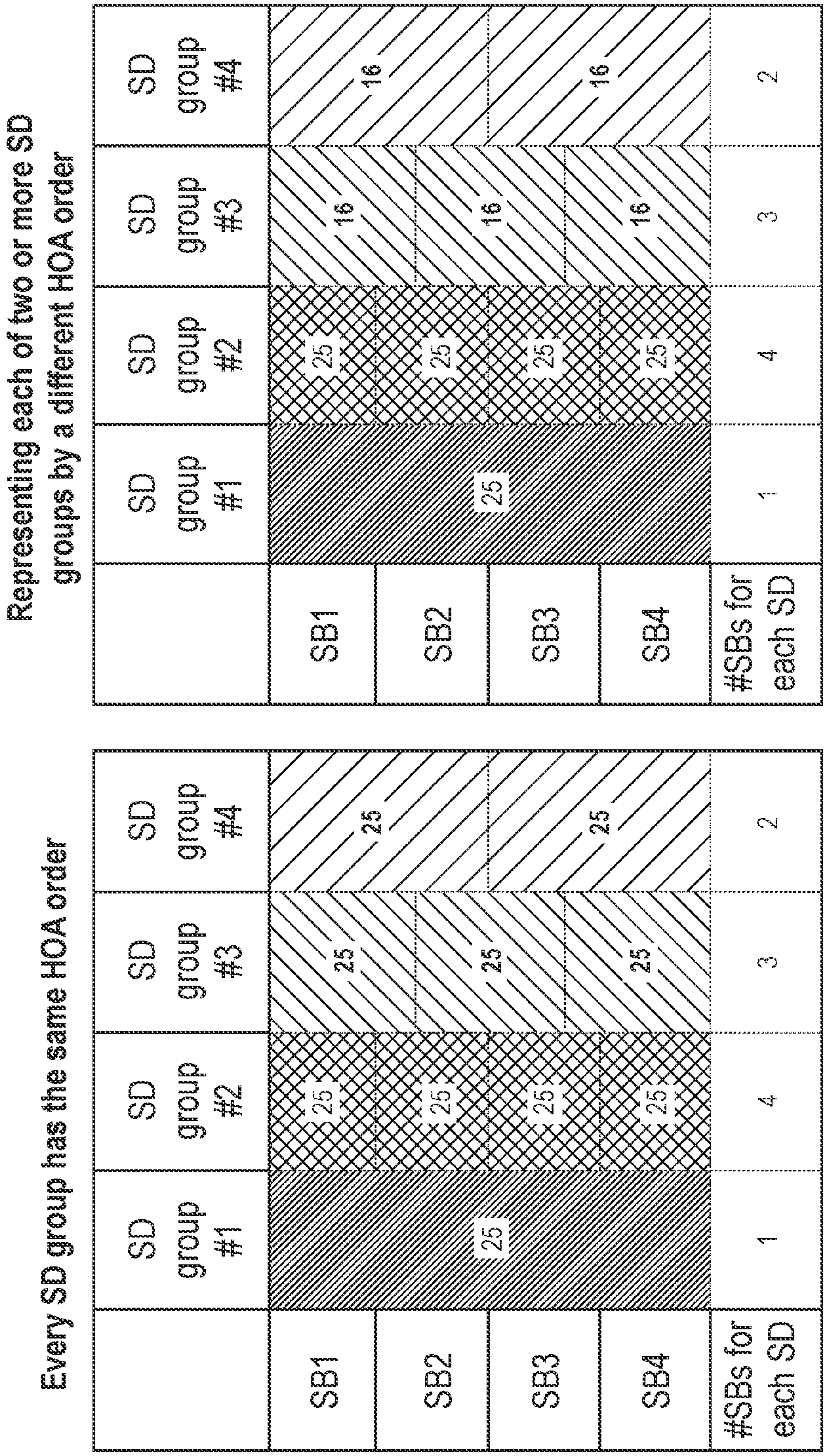
FIG. 16 has a chart view of an arrangement of SD components in an encoded audio bitstream in which each of two or more SD groups is represented by a different HOA order.

Turning now to FIG. 16, this figure shows a chart view of an example arrangement of SD components (in an encoded audio bitstream generated by a multiple SB HOA data compression technique) in which each of two or more SD groups is represented by a different number of HOA coefficients. If the number of HOA coefficients is M, the corresponding HOA order is sqrt(M)−1. The number of HOA coefficients may be represented by the number of elements in a given SD, or by the width dimension of an HOA matrix H. In general, for the number of HOA coefficients M (e.g., an input HOA matrix H having N rows and M columns), some of the SD groups that are produced by analysis operations performed based upon the input HOA matrix can be represented by the number of HOA coefficients L where $L<M$. To illustrate, consider the chart in the left hand side of FIG. 16 in which every SD group has the same number of HOA coefficients, 25, in comparison to the chart in the right hand side in which each of two or more SD groups are represented by a different HOA order—each of the SDs in SD group #3 and in SD group #4 is of the number of HOA coefficients 16 while the SDs in group #2 are each of the number of HOA coefficients 25.

Also, in this particular example, SD group #1 has a single wide-band SD that spans the full bandwidth of the audio content. The wide-band SD may be produced through a time domain analysis of the input HOA matrix, and then its contribution is removed from the input HOA matrix resulting in a residual HOA matrix. The remaining SD groups are produced through frequency domain analysis of the residual HOA matrix. Note also that the number of analysis operations needed for each SD group are indicated in the charts: SD group #1 needs a single time domain analysis operation; SD group #2 has four sub-bands and therefore needs four frequency domain analysis operations; SD group #3 has three sub-bands and so needs three frequency domain analysis operations; and finally SD group #4 needs two frequency domain analysis operations.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. The description is thus to be regarded as illustrative instead of limiting.

What is claimed is:

1. A method for encoding higher order ambisonics data, HOA data, using principal components analysis or any linear transform, the method comprising:

subtracting a mean vector from an input HOA matrix to compute a mean subtracted HOA matrix, wherein the input HOA matrix represents a sound field of a digital audio content;

producing a spatial descriptor, SD, by performing principal components analysis, PCA, or any linear transform based upon the mean subtracted HOA matrix;

extracting a salient component from the mean subtracted HOA matrix;

formatting the salient component, the SD and the mean vector into an encoded audio content bitstream; and transmitting the encoded audio content bitstream over the Internet to a decoding side of a playback system.

2. The method of claim 1 wherein the mean vector is a row vector, each element of the row vector being an average of a corresponding column in the input HOA matrix.

3. The method of claim 1 wherein performing PCA or any linear transform comprises:

determining a zero mean covariance matrix using the mean subtracted HOA matrix, and the PCA or linear transform is performed upon the zero mean covariance matrix.

4. The method of claim 3 wherein determining the zero mean covariance matrix comprises multiplying a transpose of the mean subtracted HOA matrix by the mean subtracted HOA matrix.

5. The method of claim 1 wherein extracting the salient component comprises multiplying the SD and the mean subtracted HOA matrix.

6. The method of claim 1 further comprising transmitting the encoded audio content bitstream, wherein the encoded audio content bitstream is to be interpreted by a decoding side process as adding the mean vector when computing an HOA matrix.

7. The method of claim 6 wherein the salient component comprises an audio signal, the method further comprising encoding the audio signal for bitrate reduction separately from the SD.

8. The method of claim 1 further comprising:

transforming a wide-band HOA matrix into at least a plurality of sub-band HOA matrices, wherein the input HOA matrix is one of the plurality of sub-band HOA matrices that is restricted to a particular sub-band, and the SD and the salient component are restricted to the particular sub-band.

9. A method for decoding higher order ambisonics data, HOA data, the method comprising:

receiving an encoded audio content bitsream over the Interet in a decoding side of a playback system;

unformatting a salient component and a spatial descriptor, SD, from the bitstream, wherein the SD was produced by performing principal components analysis, PCA, or any linear transform based upon a mean subtracted HOA matrix;

unformatting a mean vector from the bitsream; and computing an HOA matrix by multiplying the salient component with the SD and adding the mean vector.

10. The method of claim 9 wherein the mean vector is a row vector, each element of the row vector being an average of a corresponding column in an input HOA matrix.

11. The method of claim 9 wherein the salient component and the SD are associated with the mean vector in an encoded audio content bitstream.

12. The method of claim 9 wherein the SD was produced by performing principal components analysis, PCA, or any linear transform upon a mean subtracted HOA matrix, and the salient component was extracted from the mean subtracted HOA matrix.

13. The method of claim 9 further comprising:

receiving a flag, wherein the flag controls whether or not the mean vector is used for computing the HOA matrix.

14. The method of claim 9 wherein the HOA matrix is a sub-band HOA matrix.

15. A method for encoding higher order ambisonics data, HOA data, using principal components analysis, the method comprising:

subtracting a mean vector from an input HOA matrix to compute a mean subtracted HOA matrix wherein the input HOA matrix represents a sound field of a digital audio content;

producing a spatial descriptor, SD, by performing principal components analysis, PCA, or any linear transform based upon the mean subtracted HOA matrix;

extracting a salient component directly from the input HOA matrix using the SD;

formatting the salient component and the SD into an encoded audio content bitstream; and transmitting the encoded audio content bitstream over the Internet to a decoding side of a playback system.

16. The method of claim 15 wherein the mean vector is a row vector, each element of the row vector being an average of a corresponding column in the input HOA matrix.

17. The method of claim 15 further comprising:

associating the salient component and the SD with the mean vector and a flag into the encoded audio content bitstream wherein the flag is to be interpreted by a decoding side process as whether or not to use the mean vector for computing an HOA matrix.

18. The method of claim 15 further comprising:

transforming a wide-band HOA matrix into at least a plurality of sub-band HOA matrices, wherein the input HOA matrix is one of the plurality of sub-band HOA matrices.

* * * * *